No. 710,791. Patented Oct. 7, 1902.
L. MICHEL.
SYSTEM OF VENTILATING THE FERMENTING ROOMS OF BREWERIES.
(Application filed Jan. 16, 1902.)
(No Model.) 2 Sheets—Sheet 1.
Fig:1.
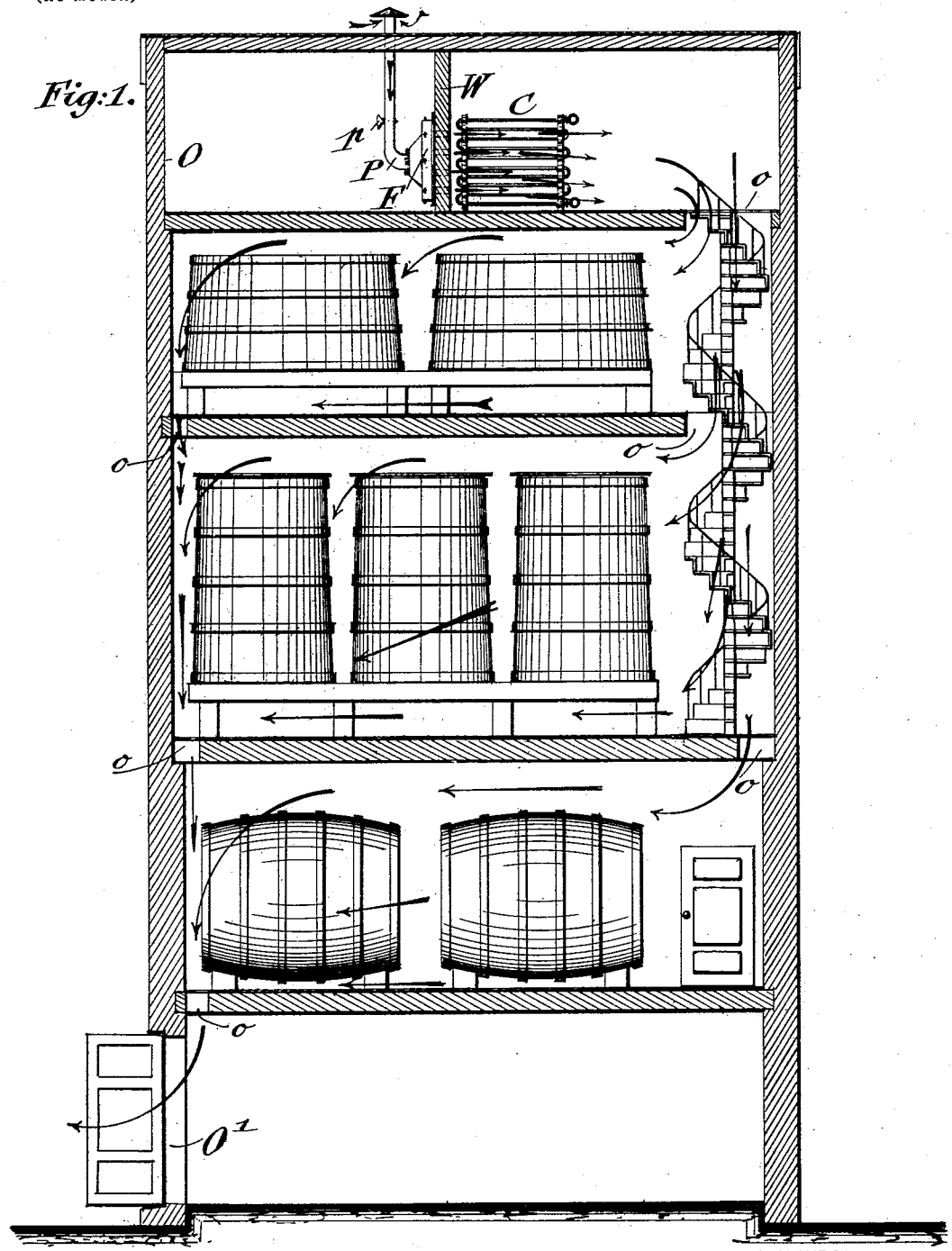
WITNESSES:
INVENTOR
Leonhard Michel
BY
ATTORNEYS

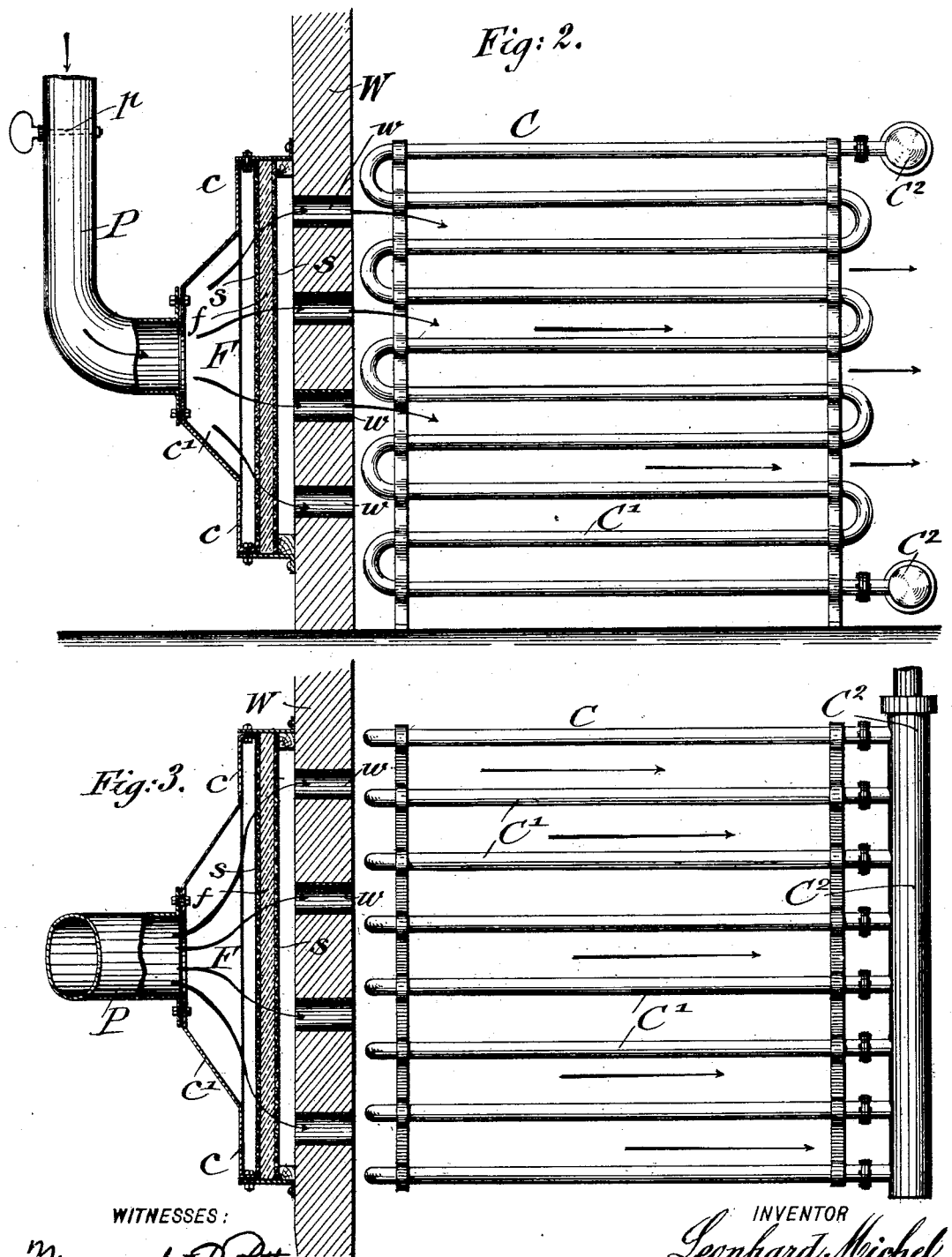

UNITED STATES PATENT OFFICE.

LEONHARD MICHEL, OF BROOKLYN, NEW YORK.

SYSTEM OF VENTILATING THE FERMENTING-ROOMS OF BREWERIES.

SPECIFICATION forming part of Letters Patent No. 710,791, dated October 7, 1902.

Application filed January 16, 1902. Serial No. 90,041. (No model.)

*To all whom it may concern:*

Be it known that I, LEONHARD MICHEL, a citizen of the United States, residing in New York, borough of Brooklyn, and State of New York, have invented certain new and useful Improvements in Systems of Ventilating the Fermenting-Rooms of Breweries, of which the following is a specification.

This invention relates to an improved system of ventilating the fermenting-rooms of breweries by a continuous supply of pure cold air circulated in such a manner as to keep the walls and corners of the fermenting-rooms of the brewery in a dry condition without requiring power-driven fans or similar devices, which in many cases cannot be conveniently applied; and the invention consists of a system of ventilating the fermenting-rooms, walls, &c., of breweries which comprises a cooler, means for supplying atmospheric air to said cooler, a filter interposed between said means and the cooler, and openings arranged in the different floors of the fermenting-rooms, adjacent the walls thereof, for distributing the filtered and cooled air by gravity in the rooms to be ventilated, as will be fully described hereinafter and finally pointed out in the claim.

In the accompanying drawings, Figure 1 represents a vertical central section through the different stories of a brewery, showing the fermenting-rooms. Figs. 2 and 3 are respectively a vertical and a horizontal section of the air filter and cooler by which the air is purified and cooled in its passage to the space to be ventilated, said figures being drawn on a larger scale and partly in section.

Similar letters of reference indicate corresponding parts.

In my improved system of ventilating the different floors of the brewery in which the fermenting-vats, shavings-casks, settling-casks, and storage-casks are arranged the air is preferably drawn into a cooling-chamber in the upper story of the building, an air filter and cooler being arranged therein, so that the air can be distributed by gravity through the stories or cellars below. For this purpose the cooler C is located in proximity to the filter F, the filter being preferably supported on the perforated wall W on the opposite side from the cooler, as shown in the drawings.

The filter F is formed of parallel screens $s$ and intermediate layers of felt $f$ or other suitable material, said screens being arranged in a suitable casing $c$, which is provided with a conical inlet portion $c'$ at one side, that is connected to the lower end of the air-supply pipe P. The air-supply pipe is extended through the roof, so as to take in the atmospheric air from outside the building. The air-supply pipe P is provided with a regulating-damper $p$, so as to regulate the supply of air to the cooler. The cooler C is constructed of a plurality of upright coils $C'$, that are supported in suitable manner and are arranged at a certain distance from each other, so as to provide sufficient space for the passage of the filtered air between the same. The filtered air passes through the apertures $w$ of the partition-wall W between the filter and the cooler, as shown in Figs. 2 and 3. The coils of the cooler are connected at their upper and lower ends with horizontal supply and discharge pipes $C^2$, through which a cooling medium, such as cold brine or ammonia vapor, is supplied thereto and conducted off. The air is passed in contact with the coils, which soon become coated with ice, and thereby cool the air as it passes between the coils, and is then conducted by gravity through suitably-arranged openings $o$ in the floors of the different stories of the building through the fermenting-rooms, cellars, &c. The openings $o$ are arranged in the floors of the building adjacent the walls thereof, so that the filtered and cooled air is distributed through the different rooms in such a manner that the air circulates in contact with the walls and in the corners, so as to keep the air in all parts of the room pure and dry.

As the cooled air is drawn off in downward direction from the cooler the pressure of the atmosphere outside of the building continually forces a new quantity of air through the filter, so as to take the place of the cold air that is conducted off through the door $O'$ in the lower story of the building or through any suitable openings provided thereat which may serve the same purpose. The greater the difference of temperature between the outside air and the air in the fermenting-rooms of the brewery building the greater is the quantity of air that enters through the supply-pipe and the filter to the cooler to be distributed through the building.

Having thus described my invention, I claim as new and desire to secure by Letters Patent—

A system of ventilating the fermenting and storage rooms of breweries, consisting of a building having a cooling-chamber in the upper story and being provided with an outlet in the lower story and distributing-openings at both ends of the intermediate floors, an inlet-pipe for supplying air to said cooling-chamber, a filter connected with the air-inlet pipe, and a cooler arranged in said cooling-chamber opposite said filter, said cooling-chamber being in communication with the lower stories of the building, substantially as set forth.

In testimony that I claim the foregoing as my invention I have signed my name in presence of two subscribing witnesses.

LEONHARD MICHEL.

Witnesses:
PAUL GOEPEL,
LOUIS B. SCHRAM.